Nov. 1, 1955 G. J. R. PIEL 2,722,601
ELECTRIC IMPULSE COUNTING CHAINS
Filed July 25, 1950
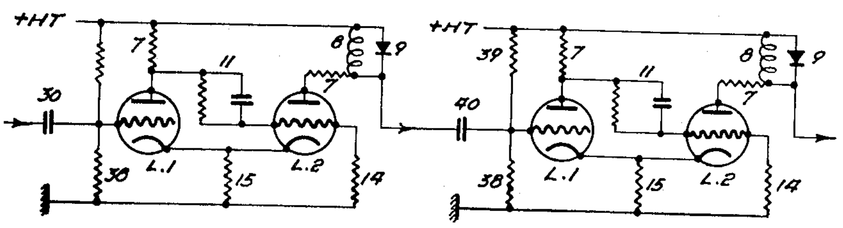
Inventor
Gerard Jean R. Piel
By Ralph B. Stewart
Attorney United States Patent Office 2,722,601

Patented Nov. 1, 1955

2,722,601

ELECTRIC IMPULSE COUNTING CHAINS

Gérard Jean René Piel, Paris, France, assignor to Societe d'Electronique et d'Automatisme, Paris, France, a corporation of France Application July 25, 1950, Serial No. 175,809

Claims priority, application France August 1, 1949

3 Claims. (Cl. 250—27)

The present invention relates to improvements in electric impulse counting chains constituted by a cascade arrangement of bi-stable trigger circuits, operating individually as binary stages, that is, stages which only deliver, for each pair of actuating impulses successively applied to their input by the preceding stage, one actuating impulse to the following stage. Such an operation of a bi-stable trigger circuit as a binary stage may, as well known, be obtained through providing the actuating or exciting signal with suitable form and amplitude, and by designing its arrangement so that no inconvenient parasitic impedance may appear on the electrodes, due to the applied signals being made use of.

Conventional binary counting chains are generally made of symmetrical bi-stable trigger circuit connected in cascade by means of such connecting circuits that said circuits eliminate impulses of one polarity issued from the preceding stage and apply the impulses of the reverse polarity from the same supply alternatively to either one of two input channels of the following stage, or according to an equivalent embodiment, to both channels in parallel. In such binary counting chains each of the cascade connected stages comprises two electron tubes (preferably pentodes) with symmetrical grid plate coupling by means of resistance-capacity networks and common cathode bias by means of a resistor and a battery. The grid bias resistors are excited in common, through a coupling capacitor. In order that said capacitor should only transmit impulses of one particular polarity, there is connected, in series with the anode resistance of the tube chosen as output or interstage coupling tube, a network made of an inductance and a unilateral conductor through which the impulses of one polarity are short-circuited.

In such binary counting chains, each stage must be adapted to be operated through the transformed voltage step obtained at the preceding stage output tube anode without interference due to the type of connection adopted. Now, said voltage step is collected from an electrode which plays an active part in the trigger operation. This is well known in all symmetrical bi-stable trigger circuits now in use and, to a still higher degree, in those of said circuits in which the transfer connection from one stage to the following one is tapped directly from the output electrode, be it the anode or any other electrode, the undesired impulse polarity being then suppressed in the connecting circuit and not at the output of said electrode. The result is that the presence of the interstage connecting circuits, independently of their structure, introduces impedance dissymmetries (as regards the stage tipping operation) which cannot be corrected since the input impedance of a symmetrical trigger circuit is in all cases variable during its operation, notwithstanding the previous choice made of the input electrode.

Moreover, in such chains, although the input signal first affects only the tube that is in unlocked condition at the instant at which said signal is applied, said signal, during flip-flop operation, is always in opposition to the signal amplified through the unlocked tube, in the locked tube the condition of which is to be changed.

Consequently, when constructing such binary chains, the problem of ensuring the operational security is made particularly difficult in that it necessitates a very precise choice of tube gains and a well defined form of input signals, in order that dephasing due to parasitic capacities and intertubes liaison capacities should allow a correct flip-flop operation (if the input impulse is very short and the signal amplified in the unlocked tube is sufficiently dephased the above-mentioned opposition effect is highly reduced).

In practice, this has as a result, as is well known, that designing such binary chains is always a quite delicate operation, and that adjustments must be frequently rectified when replacing a tube, and principally, also, that the tube supply voltages must be protected against variations of the mains voltage.

Dissymmetrical input trigger stages are also known. In one of these the circuit of the tubes is kept symmetrical, but the input through the coupling capacitor acts only on the grid of one tube while the grid of the other tube of a pair receives no input impulse, such decoupling being due to self-bias resistors. In another type, the so-called Schmitt's circuit, the circuit of the tubes is asymmetrical, comprising only one connection between the anode of the first tube and the grid of the second.

None of these trigger circuits may be directly inserted in a binary chain, as the trigger circuit can only operate when impulses of alternating polarities are applied to its input electrode, and, consequently, it would not operate as a binary stage, as it would remain locked in the position to which the preceding stage would have brought it through application of the impulse having the polarity determined by the connection of the unidirectional conductive element.

One object of the present invention is to provide a binary counting chain of any desired number of bistable trigger stages connected in cascade, which does not have the limitations and disadvantages of binary counting chains of the prior art, and to do this by the use of dissymmetrical control trigger stages which are coupled in cascade by means of novel interstage coupling circuits so designed that the stages can tip or trip from one balanced condition to another whenever there is applied to their input electrode the fixed predetermined-polarity impulse issuing from the preceding stage.

The invention is illustrated diagrammatically in the single figure of the drawing which shows two binary trigger stages connected in cascade, the two stages being identical and the same elements in the two stages being represented by the same reference numerals, except for the input coupling condensers in the two stages.

Each stage is formed of an input tube L1 and an output tube L2 connected as a trigger stage, the resistances 7, inductances 8, rectifier elements 9 being connected in the usual manner. The two tubes are provided with a common cathode biasing resistor 15, and tube L2 is provided with a grid resistor 14. The anode of tube L1 is connected to the control grid of tube L2 by the network 11 formed of a condenser and a parallel resistor. The grid of each input tube L1 is connected to a potentiometer formed of resistors 38 and 39 connected between ground and the source of anode potential, and the input to each stage is connected to the same point on the potentiometer through a coupling condenser 30 for the first stage and 40 for the second stage.

The essential feature of the invention is that when impulses of only one polarity are applied to the input of the first stage, impulses of alternately positive and negative polarity are applied to the input tube of the second stage.

If tube L1 is locked or blocked, a positive impulse applied to connection 30—38, causes the tipping or tripping of the stage, due to releasing of tube L1 and locking of tube L2. If a further positive impulse is then applied to said connection and if, following the preceding tipping, tube L1, released, is biased to zero grid potential, due to the small impedance of the input grid circuit, capacitor 30 is being charged to the crest voltage of said further impulse, so that, during the return time of the impulse the grid potential of tube L1 sinks till it brings said tube L1 to the point at which its plate current begins to flow (the so called "cut-off" point of the tube) and causes the desired tipping. Accordingly, for the back-stroke front of the impulse, the grid impedance of tube L1 has become of a practically equal value to that of resistor 38 and the grid-leak potential variation then follows the shape of said front.

The time constant R. C. of the input connection is, of course, chosen of a value less than to the minimum interval separating two consecutive input impulses, so that capacitor 30 may be discharged during said time interval and that the system should accordingly recover its rest condition during said time interval.

The stability or security of binary counting chains according to the present invention will be rendered evident by referring further to the second stage controlled from the first stage through condenser 40.

Considering in said diagram the released tube L2 and the locked tube L1, if E designates the high voltage potential and if it is further assumed that values $R_{11}$ and $R_{14}$ of resistors 11 and 14 are high with reference to resistor $R_7$ of the input tube L1, the voltage on input grid of tube L2 has the following value $$V=E\frac{R_{14}}{R_{11}+R_{14}}$$

and resistor $R_{15}$ can then be determined in such a manner that tube L2 be at zero grid potential, while delivering a current $T_o$. The cathode potential of said tube is then equal to potential V.

If the potential fixed by resistor bridge 38—39 is $V_e$ and is low enough with reference to V so that tube L1 is definitely below cut-off, the system will be stable in this condition, even with large variations of E, because potential $V_e$, like potential V, follows said variations.

If potential V is higher than the voltage drop across $R_{15}$, tube L2 remains at zero grid potential for large variations of high voltage E, because a grid current will flow through resistor $R_{11}$.

Such a dimensioning will be realised in practical applications of binary chains according to the invention.

On the other hand, due to loading resistor $R_7$ of tube L1, current $T_o$ of said tube, when its grid is at zero potential, delivers a cathode voltage $R_{15}.T_o$ which is greater than $V_o$ and consistent with the unlocking of tube L1. Voltage drop $R_7.T_o$ may in all cases be so great as to provide a grid potential of tube L2 which completely locks or blocks said tube. With regard to this, it may be advantageous, when designing the circuit, to maintain a grid current through resistor 39 when tube L1 is released, to make sure that said tube remains at zero grid potential in spite of large high voltage variations, which is a condition required for the operation described. Coupling capacitor 30 or 40 must be possibly charged up to the peak value of the input impulse when tube L1 is released.

The large current variation in tube L2 provides a large amplitude at the output of unidirectional conductive member 9. Now, to actuate such a bi-stable stage, it is sufficient to provide an input impulse amplitude higher than the voltage value for which both tubes L1 and L2 are simultaneously in conductive condition, such a condition being obtained through the relative dimensioning of resistors 7 and 15. Such a circuit is accordingly quite stable, with regard to signals available at the provided connections.

What I claim is:

1. An electric impulse counting chain comprising a plurality of cascade-connected bistable trigger circuits individually operating as binary stages, each of said stages including an unsymmetrical input circuit and an output circuit, means incorporated in said output circuit to suppress impulses of a predetermined polarity whilst transmitting impulses of the reverse polarity to the following stage, and interstage coupling means for delivering, when actuated by an impulse of the unsuppressed polarity, to the unsymmetrical input circuit of the following stage, two consecutive voltage pulses of opposite polarities, spaced by a period of time less than the time period necessary for said stage to tip over, said interstage coupling means including a capacitor connected in series between the output of one stage and the input of the following stage and a potentiometric resistor arrangement cooperating with said capacitor and the actuation input circuit of the said following stage, in such manner that said potentiometric resistor arrangement constitutes a self-biasing network for the said following stage.

2. An electric impulse counting chain comprising a plurality of cascade-connected bistable trigger circuits individually operating as binary stages, each of the stages in said cascade comprising an input valve with a grid and a ground, an unsymmetrical actuation input circuit and an output circuit, means incorporated in said output circuit to suppress impulses of a predetermined polarity whilst transmitting impulses of the reverse polarity to the following stage, and interstage coupling means for delivering, when actuated by an impulse of the unsuppressed polarity, to the unsymmetrical input circuit of the following stage, two consecutive voltage pulses of opposite polarities, spaced by a period of time less than the time period necessary for said trigger stage to tip over, said interstage coupling means including a capacitor connected in series between the output of one stage and the input of the following stage and a potentiometric resistor arrangement connected between the grid of the said input valve of said stage and the said ground and cooperating with said capacitor and the actuation input circuit of the following stage, in such a way that said potentiometric resistor arrangement constitutes a self-biasing network for the said following stage.

3. An electric impulse counting chain comprising a plurality of cascade-connected bistable trigger circuits individually operating as binary stages, each of the stages in said cascade comprising an input tube with a grid, an unsymmetrical actuation input circuit and an output circuit, means incorporated in said output circuit to suppress impulses of a predetermined polarity whilst transmitting impulses of the reverse polarity to the following stage, and interstage coupling means for delivering, when actuated by an impulse of the unsuppressed polarity, to the unsymmetrical input circuit of the following stage, two consecutive voltage pulses of opposite polarities, spaced by a period of time less than the time period necessary for said stage to tip over, a high voltage supply and a ground, said interstage coupling means including a capacitor connected in series between the output of one stage and the input of the following stage and a potentiometric resistor arrangement connected between the high voltage supply and said ground cooperating with said capacitor and the actuation input circuit of the said following stage in such a way that said potentiometric resistor arrangement constitutes a self-biasing network for the said following stage, an intermediate tap on said potentiometric arrangement, and a connection from said tap to the grid of the input tube of said following stage.

References Cited in the file of this patent

UNITED STATES PATENTS

| | | |
|---|---|---|
| 2,252,599 | Lewis | Aug. 12, 1941 |
| 2,402,917 | Miller | June 25, 1946 |
| 2,424,481 | McCoy | July 22, 1947 |
| 2,426,205 | Grieg et al. | Aug. 26, 1947 |
| 2,470,028 | Gordon | May 10, 1949 |
| 2,478,683 | Bliss | Aug. 9, 1949 |
| 2,515,195 | Clark | July 18, 1950 |
| 2,536,808 | Higinbotham | Jan. 2, 1951 |
| 2,589,240 | Frye | Mar. 18, 1952 |